United States Patent Office
3,697,273
Patented Oct. 10, 1972

3,697,273
FORMATION OF PHOTOGRAPHIC IMAGES
Yoshihide Hayakawa and Yasuhiro Noguchi, Asaka-shi, Saitama, Japan, assignors to Fuji Photo Film Co., Ltd., Kanagawa, Japan
Filed Apr. 21, 1969, Ser. No. 817,520
Int. Cl. G03c 5/00
U.S. Cl. 96—35.1        24 Claims Vinyl or vinylidene polymer images are formed in conformance with a photographic latent image by developing a silver halide emulsion layer in the presence of a vinyl or vinylidene monomer using a reducing agent which initiates polymerization as a result of the development of the silver halide. The specific improvement comprises developing the emulsion layer in a solution containing both reducing agent (A) and a developing agent containing a structure represented by the following formula:

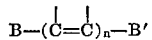

The above moieties are defined in the specification. The amount of developing agent is less than $\frac{1}{100}$ mole per mole of reducing agent (A). An alternative embodiment comprises preliminarily developing the silver halide emulsion layer with a developing agent having the above general formula, and then conducting development and polymerization with reducing agent (A).

BACKGROUND OF THE INVENTION

Field of the invention

The present invention relates generally to a process for forming photographic images and more particularly to a process for selectively forming an image of a high molecular weight compound by a polymerization reaction induced by the development of a photographic emulsion layer.

Description of the prior art

When a photographic silver halide emulsion layer bearing a latent image thereon is developed by a specific reducing agent in the presence of a vinyl compound or a vinylidene compound, the polymerization of the aforesaid vinyl compound or the vinylidene compound occurs simultaneously with the formation of a silver image.

Examples of such specific reducing agents are the resorcinols and m-aminophenols described in U.S. application, Ser. No. 643,978, filed June 6, 1967; the naphthol derivatives described in U.S. application, Ser. No. 701,873, filed Jan. 31, 1968; the 2-pyrazoline-5-ones and 3-pyrazoline-5-ones claimed in U.S. application, Ser. No. 756,005, filed Aug. 28, 1968; and the substituted phenols claimed in U.S. application, Ser. No. 790,457, filed Jan. 10, 1969. A method of forming a dye image by dyeing a charged polymeric image formed by the use of such a polymerizing reaction as above is described and claimed in U.S. application, Ser. No. 719,592, filed Apr. 8, 1968.

However, since the reducing ability of these specific reducing agents is weaker than that of developing agents usually used for photography, development using such reducing agents takes a comparatively longer period of time, and, in addition, the photographic sensitivity obtainable by such a polymerization reaction is generally low.

On the other hand, Metol and hydroquinone which are usually used as developing agents generally have no ability to initiate polymerization by development. On the contrary, in most cases, these compounds, or their oxidation products, act as inhibitors for radical polymerization.

SUMMARY OF THE INVENTION

It has been found that in a process for forming an image which comprises a vinyl polymer or a vinylidene polymer which conforms to a photographic latent image by developing a silver halide emulsion layer carrying the latent image in the presence of a vinyl monomer or a vinylidene monomer using at least one reducing agent (A) which initiates polymerization as a result of the development of the silver halide, improved results can be obtained by developing the emulsion layer in a developing solution which contains both reducing agent (A) and a developing agent having, in the molecule thereof, a structure represented by general Formula I

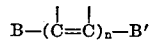

In the above formula B and B' can each represent a member selected from the group consisting

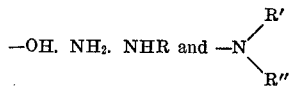

wherein R, R' and R" each can represent a member selected from the group consisting of an alkyl group, and a substituted alkyl group, and n is a positive integer. The amount of developing agent should be less than $\frac{1}{100}$ mole per mole of reducing agent (A).

In an alternative embodiment, the silver halide emulsion layer can be preliminarily developed with a developing agent having a structure represented by the above general Formula I, and then development and polymerization can be conducted using only reducing agent (A) to increase the rate of formation of the polymeric image. The developing agent should be present in an amount of less than $\frac{1}{100}$ mole per mole of reducing agent (A).

One object of the present invention is, in a process of forming a photographic image of a polymer corresponding to a photographic latent image by developing a silver halide photographic emulsion layer bearing the latent image in the presence of at least one vinyl compound or vinylidene compound with at least one reducing agent which has the ability to initiate polymerization of the vinyl or vinylidene compound as a consequence of the development of the silver halide, such as resorcinols, m-aminophenols, naphthols, pyrazoline-5-ones and phenols, to accelerate the rate of development and to increase the effective sensitivity of the photographic emulsion revealed by the polymer image.

DESCRIPTION OF THE PREFERRED EMBODIMENTS

Figure 1:
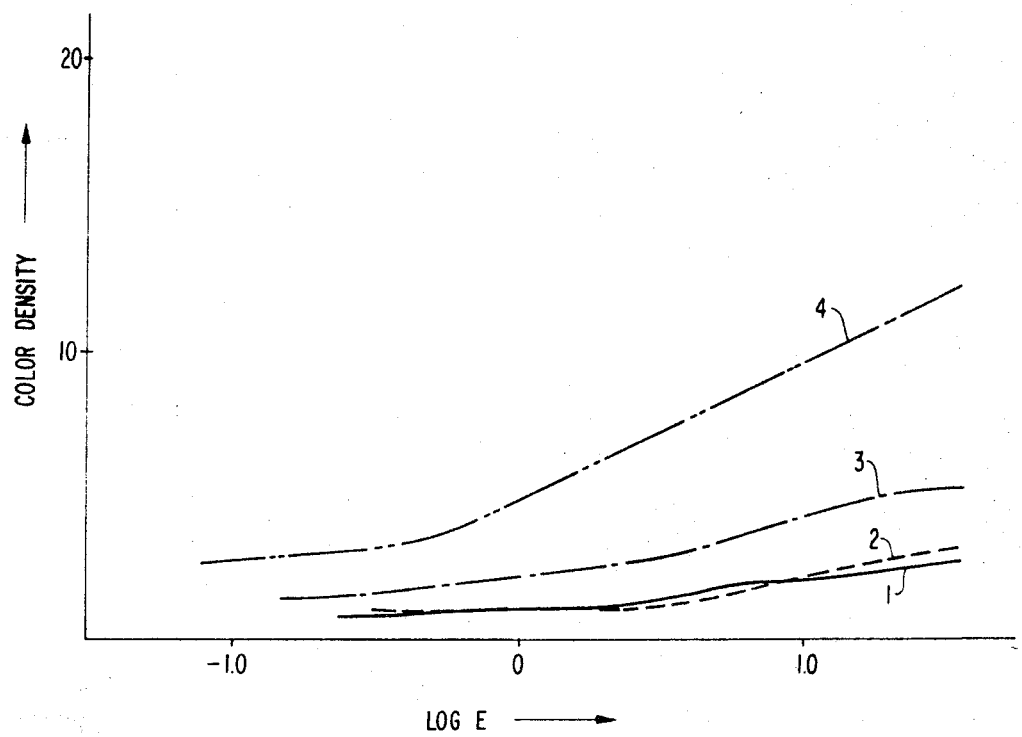
FIG. 1 is a plot of the color density of the film sample versus the logarithm of exposure (E) for a silver halide image on a series of films.

The objects of this invention can be attained by employing a conventional developing agent having the following general structure (I)

$$B—(C=C)_n—B' \qquad (I)$$

wherein B and B' can each represent

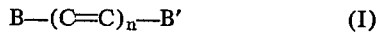

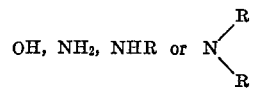

(where R, R' and R" can represent an alkyl group or a substituted alkyl group) and n is a positive integer. This developing agent has practically no ability to initiate the polymerization of a vinyl compound and/or a vinylidene compound. It is used in combination with a reducing agent having an ability to initiate the polymerization in an amount of less than 1/100 mole per one mole of the reducing agent having the function of initiating the polymerization in the development of a silver halide photographic light-sensitive emulsion layer bearing a photographic latent image in the presence of a vinyl compound or a vinylidene compound, or by preliminarily developing a silver halide photographic emulsion layer having a photographic latent image with a conventional developer, and thereafter conducting the development and polymerization with the aforesaid reducing agent having the function of initiating polymerization. Most preferably the alkyl or substituted alkyl group recited above has 1–5 carbon atoms, and $n$ is most preferably 1–4.

Reducing agents having the function or ability of initiating polymerization as a consequence of the development of the silver halide and useful for this invention include resorcinols and m-aminophenols described in U.S. application Ser. No. 643,978, filed June 6, 1967; naphthol derivatives described in U.S. application Ser. No. 701,873, filed Jan. 31, 1968; 2-pyrazoline-5-ones and 3-pyrazoline-5-ones described in U.S. application Ser. No. 756,005, filed Aug. 28, 1968; and the substituted phenols described and claimed in U.S. application Ser. No. 790,457, filed Jan. 10, 1969.

Typical examples of the above are as follows:

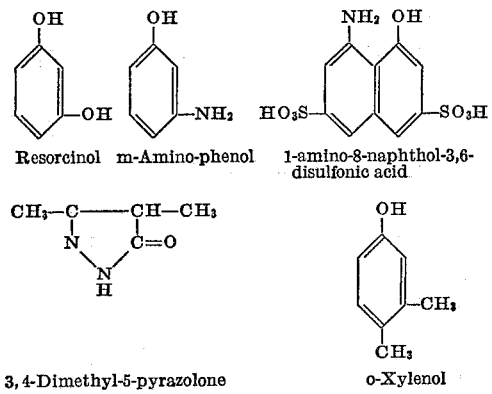

Resorcinol   m-Amino-phenol   1-amino-8-naphthol-3,6-disulfonic acid 3,4-Dimethyl-5-pyrazolone         o-Xylenol Conventional developing agents represented by the aforesaid Formula I which has practically no ability to initiate polymerization of a vinyl compound or a vinylidene compound and which are useful in the present invention are well known in this field of the art, and described in, for example, C. E. K. Mees and T. H. James, "The Theory of the Photographic Process"; 3rd edition, pp. 285–298, published in 1967 by the MacMillan Co.

Typical examples of such reducing agents are hydroquinone, catechol, pyrogallol, p-aminophenol, 2,4-diaminophenol, N-methyl-p-aminophenol, p-hydroxyphenyl glycine, p-diaminobenzene, p-aminodiethylaniline, chlorohydroquinone, ascorbic acid, 4-diethylamino-2-methylaniline, 3,4-dihydroxy diphenyl, and the like.

It is well known that when a combination of hydroquinone and p-methylaminophenol or a combination of hydroquinone and 1-phenyl-3-pyrazolidone is utilized from the development of photographic light-sensitive elements, a so-called super additive effect is observed, that is, a higher developing rate than that calculated from the mere addition of the rate of each of the above compounds used individually. Various mechanisms have been proposed to explain this effect.

It is important to note that the combination in the present invention is different from conventional combinations in the reducing agent used, in the purpose of its application and in the effect of its application. While in conventional combinations both of the reducing agents (developing agents) are employed only for the reduction of the silver halide and super additivity is found for the rate of this reduction of silver halide, in the combination of the present invention one of the reducing agents has the function of initiating a radical polymerization as a consequence of the development of silver halide to silver, and the other reducing agent (conventional developing agent having general Formula I) has only the function of reducing the silver halide to silver. Thus the nature of the present invention lies in the acceleration of the polymerization reaction caused by the use of the combination of the conventional developing agent (which has substantially no ability of initiating polymerization by itself) with the reducing agent which has the function of initiating polymerization to facilitate the reaction of the latter with the silver halide.

The amount of agent (A) utilized in the present invention is preferably from 1/20–5 moles, most preferably 1/10–1 mole/liter.

Although the mechanism of the development of a silver halide photographic emulsion layer, particularly the mechanism for the initial stage, is not yet sufficiently clarified and it is also not clear how the combination of this invention acts effectively, the following two mechanisms can be considered.

The first possible mechanism is that the conventional developing agent of Formula I, which has strong normal developing ability but no ability to initiate polymerization, initially acts on the development centers of the silver halide grains and enlarges the sizes of the centers to facilitate the action of the reducing agent which has the function of initiating the polymerization (with a weak standard developing ability). This is possible since it is well known that in general developed silver acts autocatalytically in the process of the development of the individual grains.

The second possible mechanism is that the reducing agent having the function of initiating the polymerization is oxidized by the oxidation product of the developing agent of Formula I to initiate the polymerization.

The fact that the action of reducing agent having the function of initiating the polymerization is accelerated by weakly developing the emulsion layer with the conventional developing agent of Formula I before the development with the former seems to support the first mechanism.

On the other hand, many developing agents having structure (I) and or the oxidation products thereof have been known as inhibitors of radical polymerization, and hence, when the concentration of these compounds is too high, polymerization is inhibited. Since the developing agent having structure (I) has a lower oxidation reduction potential (i.e., a stronger reducing ability) then the reducing agent having the function of initiating polymerization by about 200 to 300 mv., if the concentration ratio of the reducing agent or developer having the function of initiating polymerization with respect to the reducing agent or developer having structure (I) is not high enough, the former can neither reduce the silver halide nor reduce the oxidation products of the developing agent having structure (I). From these reasons, the amount of the developing agent having structure (I) must be lower than the developer having the function of initiating polymerization.

When employing the reducing agent having the function of initiating polymerization and the developing agent having structure (I) simultaneously, the optimum mixing ratio of the latter to the former depends on the type of compounds used and, in general, is less than 1/100 in molar ratio, preferably from 1/200 to 1/20,000 in molar ratio.

In the case of preliminarily processing a silver halide emulsion with a developing agent having structure (I) before processing with the reducing agent having the function of initiating polymerization, there is no particular limitation with respect to the concentration of the latter, but it is desirable that the silver halide emulsion layer, once processed in the developer having structure (I), be rinsed with water so that a large amount of the developer is not introduced into the polymerization system, i.e., so that the amount is less than 1/100 mole.

The photographic emulsion, light sources for exposure, etc., used in this invention may be those usually employed in conventional developing processes such as thhose shown in U.S. application Ser. No. 643,978, filed June 6, 1967.

The vinyl or vinylidene compounds useful in the present invention are vinyl or vinylidene compounds which are susceptible to radical polymerization in general, and representative examples are shown in U.S. applications Ser. No. 643,978, filed June 6, 1967, and Ser. No. 719,592, filed Apr. 8, 1968.

For example, as useful vinyl or vinylidene compounds there are acrylic acid, methacrylic acid, maleic acid, ammonium acrylate, sodium acrylate, potassium acrylate, calcium acrylate, magnesium acrylate, zinc acrylate, sodium methacrylate, calcium methacrylate, magnesium methacrylate, zinc methacrylate, cadmium methacrylate, sodium itaconate, sodium maleate, p-vinylbenzene sulfonic acid, ammonium vinylsulfonate, sodium vinylsulfonate, potassium vinylsulfonate, 2-vinyl-pyridine, 4-vinyl-pyridine, 5-vinyl-2-methyl-pyridine, N,N-dimethylaminoethyl acrylate, N,N-diethylaminoethyl methacrylate, and the like.

Furthermore, when the process of this invention is conducted in the presence of sulfite ions, the polymerization reaction can be accelerated, in the same way as described in U.S. application Ser. No. 643,978, filed June 6, 1967.

Furthermore, color images can be obtained by selectively dyeing the images of a vinyl polymer formed by the process of this invention, which contains an acidic or basic group, with a dye of opposite acidity or basicity to that of the polymer. Examples of the acid dyes capable of being employed are C.I. Acid Yellow 7 (C.I. 56205), C.I. Acid Yellow 23 (C.I. 19140), C.I. Acid Red 1 (C.I. 18050), C.I. Acid Red 52 (C.I. 45100), C.I. Acid Blue 9 (C.I. 42090), C.I. Acid Blue 45, C.I. Acid Violet 7 (C.I. 18055), etc.; or with a basic dye such as C.I. Basic Yellow 1 (C.I. 49005), C.I. Basic Yellow 2 (C.I. 41000), C.I. Basic Red 1 (C.I. 45160), C.I. Basic Red 2 (C.I. 50240), C.I. Basic Violet 3 (C.I. 42555), C.I. Basic Blue 25 (C.I. 52025), C.I. Basic Violet 10 (C.I. 45170), etc. The dyeing may be carried out in the same manner as described in U.S. application Ser. No. 719,592, filed Apr. 8, 1968. These dye numbers mentioned above are found in the Color Index (2nd edition).

In the following examples, the invention is illustrated by reference to instances in which the polymer images formed by employing methacrylic acid as the monomer, are dyes with basic dyes, since the polymer images are thereby converted into colored images. Accordingly, the effects of the developing and reducing agents could be most clearly and numerically shown. The invention is, of course, not limited to such embodiments.

EXAMPLE 1

A photographic light-sensitive film bearing a gelatino silver chloroiodo bromide photographic emulsion layer was exposed and thereafter the development and the polymerization of methacrylic acid were conducted using the combination of 8-amino-1-naphthol-3,6-disulfonic acid and p-mono-methylaminophenol sulfate.

The film was one that had been prepared by applying a subbing coat to both sides of a polyethylene terephthalate film, applying an antihalation layer to one of the surfaces of the so under-coated film and applying to the other surface a silver halide photographic emulsion, which was prepared by adding a conventional amount of merocyanine dyes with a sensitization maximum of about 550 nm. (for the sake of optical sensitization) and 1.5 g. of mucochloric acid as a hardening agent and further adding suitable amounts of state-of-the-art stabilizing and wetting agents to a gelatino silver chlorobromide emulsion containing, per mole of silver, about 0.7 mole of chlorine, about 0.3 mole of bromine, about 0.001 mole of iodine and about 100 g. of lime-processed gelatin, to thus make a coated film containing 50 mg. of silver per 100 cm.$^2$. There was further applied on said emulsion layer a gelatin protective layer of about 0.8 micron thickness which was suitable for making line and half-tone images in graphic arts usage.

Four samples of this film were exposed to light of 50 luxes for 1 second through an optical wedge of 0.15 in density increment per step, respectively, and thereafter developed in a developer having the following composition:

Sodium methacrylate _____ 75 g.
8-amino-1-naphthol-3,6-disulfonic
  acid _____ Shown in the following table.
p-Monomethylaminophenol sulfate _ Shown in the following table.
Potassium metabisulphite _____ 3 g.
Sodium hydroxide (2 N soln.) ____ Amount necessary to adjust pH to 9.0.

Water to make 150 ml.

| Test Number | 1 | 2 | 3 | 4 |
|---|---|---|---|---|
| 8-amino-1-naphthol-3,6-disulfonic acid, grams | 14.4 | 0 | 14.4 | 14.4 |
| p-Monomethylaminophenol sulfate, milligrams | 0 | 17 | 17 | 172 |

Samples 1, 2 and 3 were developed for 10 minutes and sample 4 for 7 minutes at 30° C. They were then washed with 1.5% acetic acid for 30 seconds and fixed in the following fixing composition:

G.
Sodium thiosulfate (anhydrous) _____ 150
Potassium metabisulphite _____ 15
Water to make 1 liter.

Each of the samples fixed and washed with water was divided into two portions. One portion was immersed in an aqueous 0.1% solution of a red basic dye, Rhodamine 6, G.C.P. (C.I. Basic Red 1) for 5 minutes, washed with an aqueous 5% solution of acetic acid for five minutes, to remove the dye from the portions where the polymer image had not been formed, washed with water, treated with Farmer's reducer to oxidize and remove the washed silver image therefrom, washed with water and dried.

Figure 2:
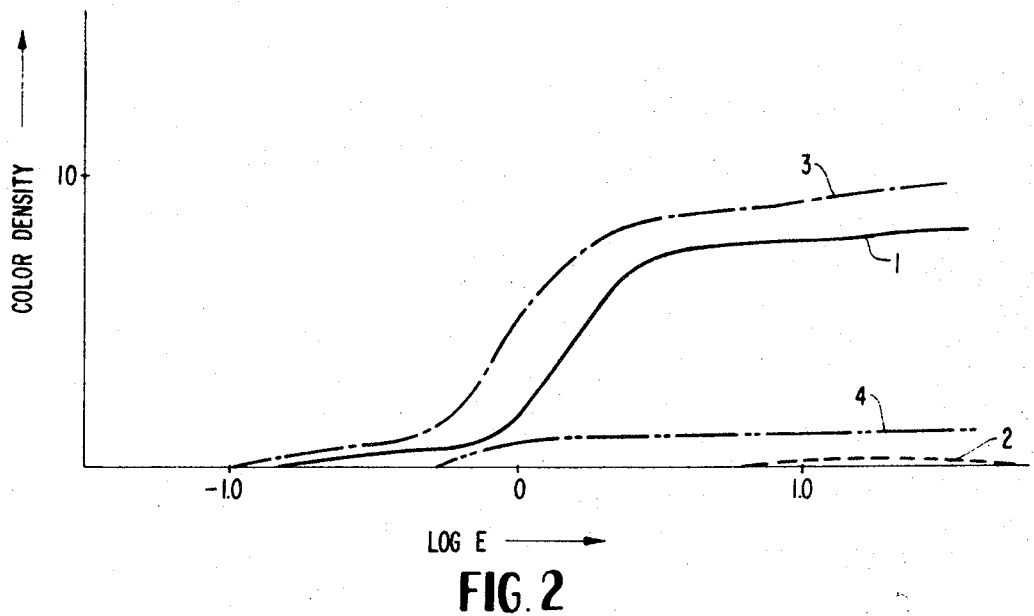
FIG. 2 is a plot of color density versus the logarithm of exposure (E) for a dye image in a series of films.

Thus, an undyed silver image was formed on one of the samples, and a color image consisting of a dyed polymer image was formed on the other one. The optical density of each image was measured through a green filter, the results of which were plotted with respect to the amount of exposure (in the logarithmic scale) to provide a characteristic curve. The results are shown in FIGS. 1 and 2. Specifically, the characteristic curve obtained from the density of a silver image is shown in FIG. 1, while the characteristic curve obtained from the density of a dye image is shown in FIG. 2, in which the value of the fog has been subtracted to facilitate comparison. In each figure, the result corresponding to test 1 is shown by 1, the result corresponding to test 2 by 2, test 3 by 3, and test 4 by 4.

The color density in FIG. 2 was formed by selectively dyeing the exposed portion of the layer of polymethacrylic acid, and hence corresponds to the amount of the polymer selectively formed.

From the comparisons between test 1 and test 2, it is clear that 14.4 g. of 8-amino-1-naphthol-3,6-disulfonic acid and 17 mg. of p-monomethylaminophenol sulfate provided almost the same amount of silver image, but the former clearly provided a polymer image, whereas the latter provided no polymer image.

In test 3, where the aforesaid two components were used together, the amount of silver image obtained was near the sum of the silver image obtained from each of them, but in regard to the dye image (in spite of the fact that p-monomethylaminophenol gave no dye image by itself) the density of the dye image obtained by using 8-amino1-naphthol-3,6-disulfonic acid was generally increased by adding p-monomethylaminophenol thereto. In particular, this tendency was marked at the areas of lower exposure. This results in increasing the photographic sensitivity revealed by the dye image. For example, the logarithmic deviation ($\Delta \log E$) of the exposure necessary to provide the color density of fog $+0.3$ is 0.22 in this case, and this value corresponds to a sensitivity increase of about 65% when converted into a real number. In other words, the addition of p-monomethylaminophenol to the developer accelerates the formation of polymer for the same exposure level, and this means that the exposure necessary to form the same amount of polymer as a result of development was reduced.

In test 4, the amount of p-monomethylaminophenol in test 3 was increased to 10 times the amount thereof, and in this case, while the formation of silver image was remarkably promoted, the formation of the polymer image was suppressed.

EXAMPLE 2

Samples of the photographic film of Example 1 were exposed to light of 50 luxes for 10 seconds using the same optical wedges as in Example 1 and processed in a developer having the following composition:

| | |
|---|---|
| Sodium methacrylate | 54 g. |
| Reducing agent | Shown in the following table. |
| Developing agent | |
| Potassium metabisulfite | 1.5 g. |
| 2 N-NaOH solution | Amount necessary to adjust the pH to 10.0. |

Water to make 150 ml.

in the case of using no conventional developing agent in the processing solution.

The samples (dyed and bleached as above) were observed with the naked eye and the number of steps at which an increase in color density was observed is shown in Table 1 as the final step capable of dyeing. This corresponds to the minimum amount of exposure necessary to selectively form the polymer. Thus, the higher the final step, the higher the sensitivity provided by the processing solution. Since the optical wedges used had a step difference of 0.15, if the step number was increased by two, the amount of necessary exposure becomes ½, which means that the effective sensitivity is increased twice. Thus, as shown in experiment No. 2, when a conventional developing agent (o-aminophenol) was employed in the combination, the amount of exposure necessary was 1/25 to 1/32 that of the case where the developing agent was not employed.

When the photographic film was processed in a processing bath having the same monomer concentration and same pH as above, containing the same amounts of the metabisulfite, etc., as above, but containing no reducing agent having the ability of initiating polymerization, only a silver image was obtained, i.e., the polymer image was not observed as in the case of using p-methylaminophenol in Example 1.

EXAMPLE 3

A sample of the photographic film of Example 2 was exposed as in Example 2 and then immersed for 2 minutes at 30° C. in a 0.1 g./liter aqueous solution of catechol, the pH of which had been adjusted to 10.5 by the addition of sodium carbonate. The sample was washed three times with distilled water (15 seconds each wash) and then

TABLE 1

| Test No. | Reducing agent | Developer | Amount of reducing agent (grams) | Amount of developer (milligrams) | Developing time (minutes) | Measured step No. | Total color density | Fog density | Color density of polymer image | Final step capable of dyeing |
|---|---|---|---|---|---|---|---|---|---|---|
| 1 a | Resorcinol | Catechol | 4.95 | 0 | 35 | 10 | 0.04 | 0.04 | 0 | 4 |
| b | do | do | 4.95 | 2.0 | 35 | 10 | 0.51 | 0.04 | 0.47 | 17 |
| 2 a | do | o-Aminophenol | 4.95 | 0 | 40 | 10 | 0.12 | 0.12 | 0 | 7 |
| b | do | do | 4.95 | 1.0 | 40 | 10 | 0.64 | 0.23 | 0.41 | 17 |
| 3 a | do | Hydroquinone | 4.95 | 0 | 60 | 10 | 0.25 | 0.11 | 0.14 | 11 |
| b | do | do | 4.95 | 10 | 60 | 10 | 0.84 | 0.10 | 0.74 | 16 |
| 4 a | do | 2,4-diaminophenol | 4.95 | 0 | 45 | 10 | 0.15 | 0.14 | 0.01 | 7 |
| b | do | do | 4.95 | 2.5 | 45 | 10 | 1.57 | 0.24 | 1.33 | 18 |
| 5 a | do | Ascorbic acid | 4.95 | 0 | 75 | 10 | 0.26 | 0.17 | 0.09 | 11 |
| b | do | do | 4.95 | 2.5 | 75 | 10 | 0.44 | 0.18 | 0.26 | 14 |
| 6 a | do | Pyrogallol | 4.95 | 0 | 50 | 10 | 0.27 | 0.18 | 0.09 | 10 |
| b | do | do | 4.95 | 2.5 | 50 | 10 | 0.57 | 0.21 | 0.36 | 17 |
| 7 a | do | P-phenylenediamine | 4.95 | 0 | 45 | 10 | 0.17 | 0.14 | 0.03 | 7 |
| b | do | do | 4.95 | 2.5 | 45 | 10 | 1.04 | 0.44 | 0.60 | 15 |
| 8 a | do | P-methylaminophenol-1/2H$_2$SO$_4$ | 4.95 | 0 | 20 | 10 | 0.26 | 0.26 | 0 | 0 |
| b | do | do | 4.95 | 2.5 | 20 | 10 | 1.92 | 0.32 | 1.60 | 18 |
| 9 a | 3,4-dimethyl-5-pyrazolone | 2,4-diaminophenol | 2.80 | 0 | 20 | 5 | 0.28 | 0.16 | 0.12 | 5 |
| b | do | do | 2.80 | 2.5 | 20 | 5 | 1.31 | 0.20 | 1.11 | 17 |
| 10 a | m-Aminophenol | do | 2.75 | 0 | 40 | 10 | 0.30 | 0.17 | 0.12 | 10 |
| b | do | do | 2.75 | 5.0 | 40 | 10 | 0.54 | 0.17 | 0.37 | 17 |
| 11 a | o-Xylenol | Catechol | 3.15 | 0 | 40 | 10 | 0.95 | 0.25 | 0.70 | 15 |
| b | do | do | 3.15 | 2.5 | 40 | 10 | 2.59 | 0.48 | 2.11 | 19 |

The samples were processed at 30° C. for the time shown in Table 1 and then fixed and washed as in Example 1. The samples were then dyed and bleached as in Example 1.

To measure the effect of the developers used together, the optical densities of the samples dyed and bleached above at step 10 or step 5 of the step wedges, and also the optical density corresponding to the fog at the unexposed areas, were measured through a green filter. In the column of "color density of polymer image" in Table 1, the value obtained by subtracting the fog density from the optical density of the former is shown. The density is the density of the dye attached to the polymethacrylic acid selectively formed at exposed areas, and corresponds to the amount of the polymer selectively formed. In each of the examples from test number 1 to test number 12, the amount of the polymer formed at the same step of the wedge, that is, at the same exposure level, was larger in the case of using the conventional developing agent than processed in a solution containing the same kinds and same amounts of monomer and reducing agent as shown in Table 1, test No. 1a of Example 2, for 30 minutes at 30° C. After fixing and washing as in Example 1, the sample was dyed and bleached as in Example 1. Another sample of the same film as above was processed similarly except that the pre-treatment with catechol was omitted, and the optical densities of this sample and the sample with the pre-treatment above were measured as in Example 2. The results are shown below.

| | Step No. | Total color density | Fog density | Color density of polymer image | Final step capable of dyeing |
|---|---|---|---|---|---|
| Without pre-treatment | 10 | 0.21 | 0.15 | 0.06 | 11 |
| With pre-treatment | 10 | 1.17 | 0.15 | 1.02 | 18 |

As shown above, the amount of polymer formed by the same amount of exposure was larger in the sample with pre-treatment than in the sample without pre-treatment. Furthermore, the sample with pre-treatment showed increased effective sensitivty, and the minimum amount of exposure necessary for selectively forming polymer was reduced to about 1/11 of the non-pretreated sample.

EXAMPLE 4

Development and polymerization of sodium methacrlyate were conducted with the following two types of photographic film (A and B), both having a silver iodobromide emulsion, using the combination of resorcinol and p-methylaminophenol ½H$_2$SO$_4$.

Film A is one such as is conventionally employed in the preparation of a positive for photogravure usage in photoengraving processes, and is prepared by applying to both sides of a cellulose triacetate base a subbing layer, applying to one surface of the thus subbed base an antihalation layer, applying to the other surface of the base moderate grain size gelatino-silver halide emulsion containing 0.015 mole of iodine, 0.985 mole of bromine and 255 g. of gelatin per mole of silver, to which was added about 0.5 g. per 100 g. of gelatin of mucochloric acid as hardening agent. There was then added a conventional stabilizer and surface active agent. The total amount applied was sufficient to provide a coating layer containing 60 mg. of silver per 100 square centimeters. There was applied thereover a protective layer of gelatin of 1 micron thickness.

Film B is the type usually employed in the preparation of line or continuous tone images with a steep gradation in photoengraving processes. It is prepared by applying to the same base as film A, a fine grain gelatin-silver halide emulsion containing 0.012 mole of iodine, 0.988 mole of bromine and 204 g. of gelatin per mole of silver. This is sensitized with a rhodanate complex of monovalent gold and combined with 0.7 g. (per 100 g. of gelatin) of mucochloric acid as a hardening agent, 0.3 g. (per 1 mole of silver) of 6-methyl-4-hydroxy-1,3,3a,7-tetrazaindene as a stabilizing agent, and a conventional surface active agent, in an amount sufficient to provide a coating layer containing 60 mg. of silver per 100 sq. cm. There was then applied thereover a protective layer of gelatin of about 0.8 micron thickness.

The two sample films were exposed as in Example 2 and then processed in a developer having the following composition:

Sodium methacrylate _____ 50 g.
Resorcinol _____ ⎫
p-Methylaminophenol ½        ⎬ Shown in Table 2.
  H$_2$SO$_4$ _____ ⎭
Potassium metabisulfate _____ 1.5 g.
2 N-NaOH solution _____ Amount necessary to adjust the pH to 10.0.
Water to make 150 ml.

The samples were then processed as in Example 1, the results of which are shown in Table 2.

riod of time was increased or the exposure was increased, a polymer image was obtained using only resorcinol. Furthermore, it was also observed with films A and B that the use of p-methylaminophenol alone resulted in the formation of only silver images without the formation of a colored image which should be obtainable by dyeing the polymeric image.

What is claimed is:

1. A method for forming a polymeric image which comprises developing an imagewise exposed photographic silver halide emulsion layer bearing a latent image in the presence of at least one member selected from the group consisting of a vinyl monomer and a vinylidene monomer by treating said layer with a conventional developing agent incapable of initiating the polymerization of said vinyl or vinylidene monomer but capable of reducing said silver halide to silver and at least one organic reducing agent selected from the group consisting of resorcinols, m-aminophenols, naphthol derivatives, pyrazoline-5-ones, and substituted phenols, capable of initiating the polymerization of said monomer to form a polymeric image, said conventional developing agent having the formula $$B-(\underset{|}{C}=\underset{|}{C})_n-B'$$

wherein B and B' each represent a member selected from the group consisting of $$-OH, -NH_2, -NHR \text{ and } -N\begin{matrix}R'\\R''\end{matrix}$$

wherein R, R' and R'' are each members selected from the group consisting of an alkyl group and a substituted alkyl group, and $n$ is a positive integer, said method being carried out by employing the developing agent and organic reducing agent in the same solution, wherein the developing agent is present in an amount of less than 1/100 mole per mole of said organic reducing agent, said monomer being selectively polymerized in the areas corresponding to the latent image areas of the layer.

2. The method of claim 1, wherein said layer is first treated with a solution of the developing agent and then with a solution of the reducing agent and said monomer.

3. The method of claim 1, wherein said developing agent is a member selected from the group consisting of hydroquinone, catechol, pyrogallol, p-aminophenol, 2,4-diaminophenol, N-methyl-p-aminophenol, p-hydroxyphenyl glycine, p-diaminobenzene, p-aminodiethyl aniline, chlorohydroquinone ascorbic acid, 4-diethylamino-2-methylaniline and 3,4-dihydroxy diphenyl.

4. The method of claim 2, wherein the silver halide emulsion layer treated with the solution of the developing agent is rinsed with water prior to being treated with the solution containing the organic reducing agent.

5. The method of claim 1, wherein said developing is conducted in the presence of sulfite ions.

TABLE 2.—POLYMERIZATION ON SILVER IODOBROMIDE EMULSION LAYER

| Used film | Reducing agent | Developer | Amount of reducing agent (grams) | Amount of developer (mg.) | Developing time (minutes) | Measured step | Total color density | Fog density | Color density of polymer image | Final step capable of dyeing |
|---|---|---|---|---|---|---|---|---|---|---|
| A | Resormine | p-methylaminophenol 1/2 H$_2$SO$_4$ | 4.95 | 0 | 30 | 10 | 0.10 | 0.10 | 0 | 0 |
|   | do | do | 4.95 | 2.5 | 30 | 10 | 1.28 | 0.27 | 1.01 | 25 |
| B | do | do | 4.95 | 0 | 30 | 10 | 0.09 | 0.09 | 0 | 0 |
|   | do | do | 4.95 | 2.5 | 30 | 10 | 0.97 | 0.39 | 0.58 | 23 |

With the iodobromide photographic emulsions of this example, as well as with the chloroiodobromide emulsions of Example 1 and Example 2, substantially higher sensitivity was obtained and the amount of the polymer formed at the same exposure level was increased by the combined use of a conventional developing agent of Formula I.

Although in this example no polymer image was observed when using only resorcinol, if the developing pe- 6. The method of claim 5, wherein said precursor for said sulfite ions is potassium meta-bisulfite.

7. The method of claim 1, wherein said photographic emulsion layer is immersed in an aqueous alkaline solution containing the reducing agent, developing agent, and said monomer.

8. The method of claim 1, wherein said monomer is selected from the group consisting of acrylic acid, methacrylic acid, maleic acid, ammonium acrylate, sodium acrylate, potassium acrylate, calcium acrylate, magnesium acrylate, zinc acrylate, sodium methacrylate, calcium methacrylate, magnesium methacrylate, zinc methacrylate, cadmium methacrylate, sodium itaconate, sodium maleate, p-vinylbenzene sulfonic acid, ammonium vinylsulfonate, sodium vinylsulfonate, potassium vinylsulfonate, 2-vinyl-pyridine, 4-vinyl-pyridine, 5-vinyl-2-methylpyridine, N,N-dimethylaminoethyl acrylate, and N,N-diethylaminoethyl methacrylate.

9. The method of claim 1, wherein the amount of said developing agent employed ranges from $\frac{1}{200}$ to $\frac{1}{20,000}$ mole per mole of said reducing agent.

10. The method of claim 1, wherein the amount of reducing agent employed ranges from $\frac{1}{20}$ to 5 moles per liter.

11. The method of claim 10, wherein the amount of reducing agent employed ranges from $\frac{1}{10}$ to 1 mole per liter.

12. The method of claim 1, wherein the carbon range applicable to the alkyl groups defined by R, R' and R" is from 1 to 5 carbon atoms.

13. The method of claim 1, wherein $n$ is a positive integer of from 1 to 4.

14. The method of claim 1, further comprising the step of selectively dyeing the image of the polymer formed from said monomer, which contains an acidic or basic group, with a dye of opposite acidity or basicity to that of said polymer.

15. The method of claim 14, wherein the silver image formed during development is removed by fixation and washing with an oxidizing agent.

16. A developing composition, useful in forming a polymeric image, which comprises an aqueous solution comprising:
(a) a member selected from the group consisting of a vinyl and a vinylidene monomer,
(b) an organic reducing agent selected from the group consisting of resorcinols, m-aminophenols, naphthol derivatives, pyrazoline-5-ones, and substituted phenols, capable of initiating the polymerization of said vinyl or vinylidene monomer, and
(c) developing agent of the formula:

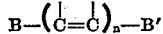

wherein B and B' each represent a member selected from the group consisting of

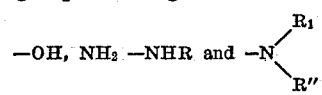

wherein R, R' and R" are each members selected from the group consisting of an alkyl group and a substituted alkyl group, and $n$ is a positive integer, said developing agent having substantially no effect in the initiation of the polymerization of said monomer, but capable of reducing said silver halide to free silver, said development agent being employed in an amount of less than $\frac{1}{100}$ mole per mole of organic reducing agent.

17. The composition of claim 16, wherein the amount of developing agent present ranges from $\frac{1}{200}$ to $\frac{1}{20,000}$ mole per mole of said reducing agent.

18. The composition of claim 16, further comprising a compound capable of supplying sulfite ions.

19. The composition of claim 18, wherein the compound capable of supplying sulfite ions is potassium metabisulfite.

20. The composition of claim 16, wherein the carbon range of said alkyl group is from 1 to 5.

21. The composition of claim 16, wherein the value for $n$ ranges from 1 to 4.

22. The composition of claim 16, wherein said developing agent is a member selected from the group consisting of hydroquinone, catechol, pyrogallol, p-aminophenol, 2,4-diaminophenol, N-methyl-p-aminophenol, p-hydroxyphenol glycine, p-diaminobenzene, p-aminodiethyl aniline, chlorohydroquinone, ascorbic acid, 4-diethylamino-2-methylaniline, and 3,4-dihydroxy diphenyl.

23. The composition of claim 16, wherein said monomer is a member selected from the group consisting of acrylic acid, methacrylic acid, maleic acid, ammonium acrylate, sodium acrylate, potassium acrylate, calcium acrylate, magnesium acrylate, zinc acrylate, sodium methacrylate, calcium methacrylate, magnesium methacrylate, zinc methacrylate, cadmium methacrylate, sodium itaconate, sodium maleate, p-vinylbenzene sulfonic acid, ammonium vinylsulfonate, sodium vinylsulfonate, potassium vinylsulfonate, 2-vinyl-pyridine, 4-vinylpyridine, 5-vinyl-2-methyl-pyridine, N,N-dimethylaminoethyl acrylate, and N,N-diethylaminoethyl methacrylate.

24. The polymeric image formed by the method of claim 1.

References Cited

UNITED STATES PATENTS

| 3,019,104 | 1/1962 | Oster | 96—29 |
| 3,038,800 | 6/1962 | Luckey et al. | 96—33 |
| 3,194,661 | 7/1965 | Cohen | 96—48 |
| 3,234,021 | 2/1966 | Scherin et al. | 96—28 |
| 3,236,644 | 2/1966 | Gilman et al. | 96—29 |

FOREIGN PATENTS 866,631 4/1961 England.

NORMAN G. TORCHIN, Primary Examiner

E. C. KIMLIN, Assistant Examiner

U.S. Cl. X.R.

96—66, 114